(12) United States Patent
Höhler

(10) Patent No.: US 12,240,704 B2
(45) Date of Patent: Mar. 4, 2025

(54) MODULAR BELT CONVEYOR

(71) Applicant: Wipotec GmbH, Kaiserslautern (DE)

(72) Inventor: Hans-Sebastian Höhler, Hildesheim (DE)

(73) Assignee: Wipotec GmbH, Kaiserslautern (DE)

( * ) Notice: Subject to any disclaimer, the term of this patent is extended or adjusted under 35 U.S.C. 154(b) by 306 days.

(21) Appl. No.: 17/795,197

(22) PCT Filed: Jan. 27, 2021

(86) PCT No.: PCT/DE2021/100080
§ 371 (c)(1),
(2) Date: Feb. 15, 2023

(87) PCT Pub. No.: WO2021/151433
PCT Pub. Date: Aug. 5, 2021

(65) Prior Publication Data
US 2023/0174311 A1   Jun. 8, 2023

(30) Foreign Application Priority Data

Jan. 28, 2020 (DE) .......................... 102020102019.8

(51) Int. Cl.
*B65G 21/06* (2006.01)
(52) U.S. Cl.
CPC .......... *B65G 21/06* (2013.01); *B65G 2207/30* (2013.01)
(58) Field of Classification Search
CPC ............................ B65G 21/06; B65B 2207/30

(Continued)

(56) References Cited

U.S. PATENT DOCUMENTS 4,467,914 A * 8/1984 Trammel ............... B65G 21/02
  138/155
4,993,542 A * 2/1991 Nomura ................. B65G 21/06
  198/816

(Continued)

FOREIGN PATENT DOCUMENTS

CN  205132315 U  4/2016
DE  102009047090 A1  5/2011

(Continued)

OTHER PUBLICATIONS

Abstract of JP 2003-227804 (Year: 2024).*

(Continued)

*Primary Examiner* — Mark A Deuble
(74) *Attorney, Agent, or Firm* — Calvert Technology Law, PLLC; Nathan H. Calvert

(57) ABSTRACT

A belt conveyor includes at least two support elements selected from a group consisting of roller holder elements and core elements for forming a conveyor plane for supporting a belt for conveying the products in a conveying direction. The at least two support elements are formed separately and the support elements directly adjoining one another are rigidly connected to one another by a fastening device. The support elements adjoining one another in the conveying direction have stop surfaces abutting one another so as to ensure a predefined alignment of adjoining support elements in three mutually orthogonal spatial directions. The first spatial direction lies in the conveying plane in the conveying direction, the second spatial direction lies in the conveying plane transversely to the conveying direction, and the third spatial direction lies perpendicularly to the conveying plane.

13 Claims, 6 Drawing Sheets

(58) Field of Classification Search
USPC .................................................. 198/860.2
See application file for complete search history.

(56) References Cited

U.S. PATENT DOCUMENTS

| | | | | |
|---|---|---|---|---|
| 5,096,045 | A | * | 3/1992 | Feldl ...................... B65G 23/34 |
| | | | | 198/816 |
| 5,609,238 | A | * | 3/1997 | Christensen ........... B65G 23/44 |
| | | | | 198/816 |
| 5,762,178 | A | * | 6/1998 | Tarlton ................... B65G 21/06 |
| | | | | 198/860.2 |
| 5,904,242 | A | * | 5/1999 | Swanson ............... B23P 21/004 |
| | | | | 198/860.2 |
| 6,612,426 | B1 | * | 9/2003 | Guerra ............... B65G 21/2072 |
| | | | | 198/841 |
| 2006/0054473 | A1 | | 3/2006 | Spoors |
| 2011/0073443 | A1 | | 3/2011 | Trivette |
| 2014/0231229 | A1 | * | 8/2014 | Aliesch ................. B65G 21/06 |
| | | | | 198/860.3 |
| 2016/0207712 | A1 | * | 7/2016 | Aliesch ................. B66B 23/028 |

FOREIGN PATENT DOCUMENTS

| | | | | |
|---|---|---|---|---|
| EP | 2767492 | A1 | | 8/2014 |
| GB | 2198107 | A | * | 6/1988 ........... B65G 19/287 |
| JP | 2002037433 | A | | 2/2002 |
| JP | 2003227804 | A | | 8/2003 |
| JP | 2014156353 | A | | 8/2014 |
| WO | 2007021196 | A2 | | 2/2007 |
| WO | 2009092174 | A1 | | 7/2009 |
| WO | 2015021567 | A1 | | 2/2015 |

OTHER PUBLICATIONS

PCT/DE2021/100080 International Search Report dated May 4, 2021.
English translation of JP Office action issued Oct. 30, 2023, in JP2022544794A.

* cited by examiner

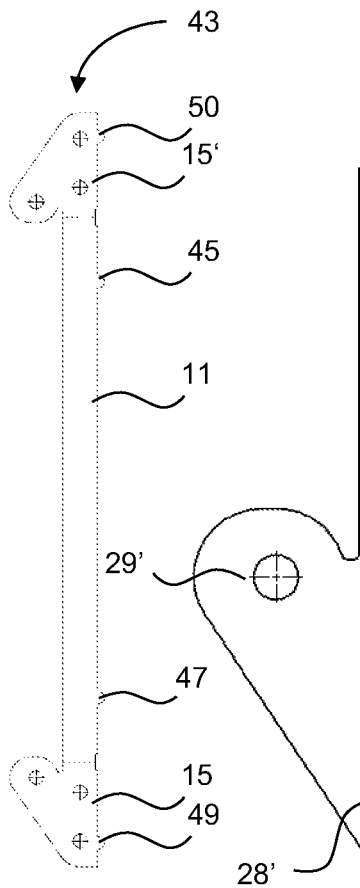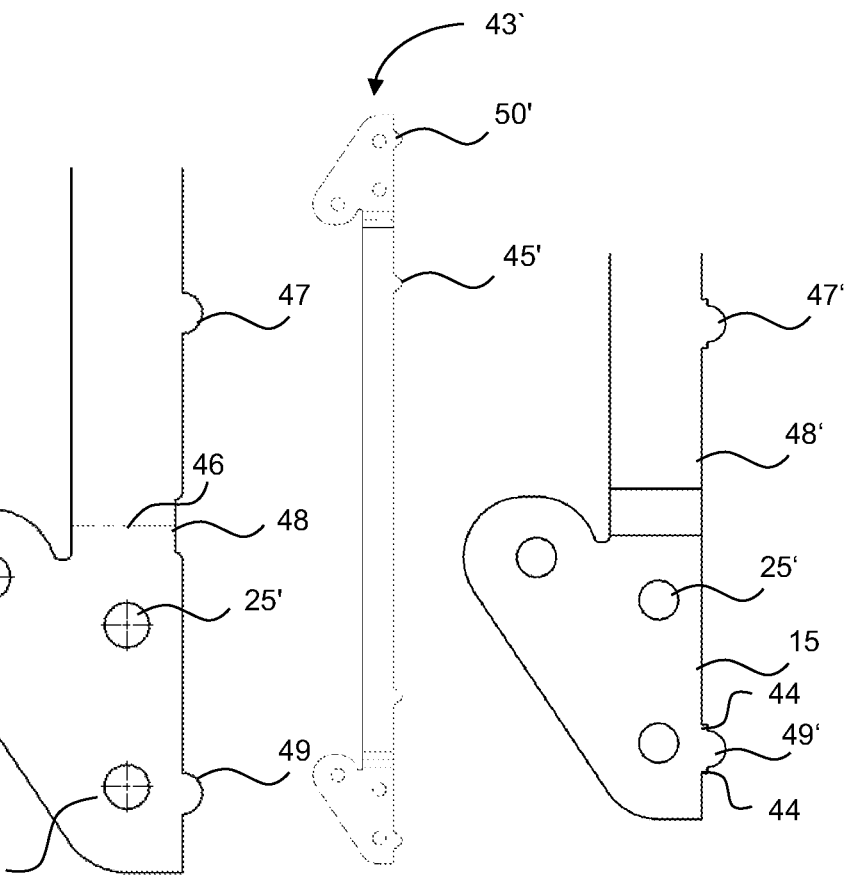
Fig. 5     Fig. 6     Fig. 7     Fig. 8

MODULAR BELT CONVEYOR

TECHNICAL FIELD OF THE INVENTION

The invention relates to belt conveyors having multiple support elements selected from a group of roller holder elements and core elements.

BACKGROUND OF THE INVENTION

Belt conveyors are used, for example, for inspection devices such as automatic scales, metal detectors, X-ray scanners, etc., to enable transport of preferably discrete products to be inspected through an inspection area.

The informative value, in particular the measuring accuracy of the inspection results, is strongly dependent on the continuity and uniformity of the movement of the objects to be examined through the inspection area.

Changes in the position of the products as well as changes in their speed can negatively influence the inspection results.

Particularly disadvantageous effects result, for example, from a transport speed that is not kept constant, a too strong lateral (strip or) belt impact, a slip between the belt and the roller driving the belt, or a change in the position of the products in relation to each other within the product flow.

In particular, an image evaluation of an X-ray scanning system device is incorrectly influenced by such effects.

If inspection devices are manufactured or retrofitted, these requirements must be taken into account, but nevertheless different purposes must be made possible, for example an inspection of products with different dimensions or sizes, in particular a change to products having a different dimension in the transport direction (product length).

The present invention addresses the task of avoiding the aforementioned disadvantages and making it possible to adapt a belt conveyor for an inspection device to the desired area of application (type and dimensions of the products to be inspected, product distance, transport speed) in a simple manner.

SUMMARY OF THE INVENTION

Various aspects of the present invention encompass belt conveyors, roller holders for belt conveyors, core elements for belt conveyors, and inspection devices with features addressing the above-mentioned and other disadvantages. Other aspects of the present invention encompass methods for manufacturing an inspection device and methods for converting an inspection device.

Belt conveyors according to a first aspect of the invention include at least two support elements from a group of roller holder elements and core elements. Accordingly, any combinations of roller holder elements and core elements are possible. This also includes combinations of at least two identically or differently designed roller holder elements and at least two identically or differently designed core elements.

In order to be able to cover a wide variety of requirements, in particular product dimensions, a belt conveyor according to the invention and thus a corresponding inspection device with such a belt conveyor can be manufactured or converted in a modular manner from at least two separately formed supporting elements, so that a preferably planar conveyor supporting surface is formed for supporting a belt for transporting products in a conveying direction.

In the assembled state, adjoining support elements in the direction of conveyance have abutting stop surfaces (for example, abutting edges or borders). These abutting surfaces have complementary profiles (e.g., projections and recesses, tongue and groove), whereby the profiles interact in such a way that a predefined alignment of adjoining support elements in three mutually orthogonal spatial directions is ensured.

This design according to the first aspect of the invention makes it possible in a simple manner to mount at least two carrying elements in a predefined alignment in all spatial positions, largely without adjustment measures. An alignment (adjustment) and, if necessary, also a checking of the alignment of a belt conveyor adapted to a specific purpose can therefore advantageously be omitted.

In some embodiments, the profiles are in the form of interlocking projections provided in the stop surfaces and complementary recesses of adjoining support elements of the belt conveyor. The support elements can have a U-shaped profile, for example in the form of a bent sheet metal part, as seen in the conveying direction, so that their end faces serve as stop surfaces. Straight, i.e., not (downwards or upwards) bent end faces serve as stop faces in some embodiments.

A fastening device can be designed accordingly in a support element as a transverse beam (transverse to the direction of conveyance) between the downwardly curved side surfaces, whereby the transverse beams of adjoining support elements can be connected with screws, bolts or the like.

In this way, a discontinuous transition, e.g., in the form of a slot or groove in the conveyor plane, can be avoided to prevent an undesirable build-up of dirt.

In some embodiments the surfaces of the interconnected support elements that form the conveyor plane are aligned, so that a conveyor plane is formed, and the belt supported thereby, has virtually no unevenness, such as bumps, cracks, etc., when transporting a product.

A preferably level conveyor plane is of course also formed in if the outer dimension of a roller or its surface (or upper line transverse to the conveying direction) and the surface of an adjoining support element are in alignment.

In order to enable a quick conversion to different product dimensions, product distances, transport speeds, etc., a belt conveyor in some embodiments may have a fastening device for rigidly connecting adjoining support elements where the fastening device is designed in such a way that the connection can be released non-destructively (screws, bolts with locking pin, clamp, etc.).

In some embodiments notches or incisions extending in the y-direction and/or z-direction are formed in the abutting surfaces of adjoining support elements in at least one part of the abutting surfaces or edges or margins between the projections or recesses, so that a gap with a predetermined width in the x-direction exists between adjoining support elements in at least one partial region. Such an open gap (or several gaps) facilitates cleaning of the device (which is particularly necessary for hygiene reasons when handling unpacked foodstuffs), since on the one hand no dirt can be deposited in these areas with open gaps and on the other hand cleaning (rinsing, steam blasting, etc.) can be carried out through the gap.

In cases where a gap between adjoining support element is formed, the width of the gap (in the x-direction) may be selected so that the products do not sink in during transfer and a vertical movement (in the z-direction) or tilting of the products (which could result in twisting) is excluded.

in some embodiments an inspection device, in particular an X-ray device, metal detector or scale, can be manufactured in such a way that parts of the inspection device, for example an inspection unit, in particular a camera or load cell or its load introduction element, are firmly connected to the core element, so that after manufacture no tolerances occur between the core element and the inspection unit or have to be compensated for by adjustment.

In such an inspection device, further adaptation to the products to be inspected can be achieved by roller holder elements mounted according to aspects of the invention—upstream and/or downstream as seen in the direction of transport—so that a desired length of the conveyor plane of the belt conveyor can be achieved. Accordingly, an already installed inspection device can also be retrofitted (in its construction length) in a simple manner in order to be able to inspect products of a different type or dimension.

In some embodiments further separate elements such as collecting containers, sorting devices, light barriers, etc. can be arranged on the belt conveyor in any combination in predefined positions, in particular in the conveying direction on the belt conveyor, in particular on the downwardly angled side surfaces.

Principles of the invention, may also be applied to provide an inspection device that is short (and narrow) in the direction of transport, in particular an X-ray inspection device, which can preferably also include at least one sorting device (within the short installation space).

For the purposes of the present disclosure and accompanying claims, a belt also means several separate (parallel) flat or round belts, straps, chains, etc., which are supported by a common flat support as a conveyor plane. This is to be distinguished from non-flat supports, such as roller conveyors or conveyor belts, which support the belt exclusively on rollers, or similar devices.

A belt conveyor according to the invention advantageously enables the transport of products to be examined and prevents their change of position (twisting) or jerky, discontinuous movement, caused for example by discontinuous transitions in the conveyor plane.

Furthermore, the predefined alignment provided by aspects of the invention can easily ensure parallelism of the roller axis (roller lying parallel to the conveyor plane) and the conveyor plane (or surfaces of the support elements), as well as the correct height alignment.

These and other advantages and features of the invention will be apparent from the following description of representative embodiments, considered along with the accompanying drawings.

BRIEF DESCRIPTION OF THE DRAWINGS

FIG. 5 shows an unbent (not yet bent) sheet metal part of a roller holder element of a belt conveyor according to FIG. 1.

FIG. 6 is an enlarged detailed view of a section of the roller holder element according to FIG. 5.

FIG. 7 shows a not yet bent sheet metal part of a roller holder element of a belt conveyor according to FIG. 1.

FIG. 8 is an enlarged detailed view of the roller holder element according to FIG. 7.

DESCRIPTION OF REPRESENTATIVE EMBODIMENTS

Figure 1:
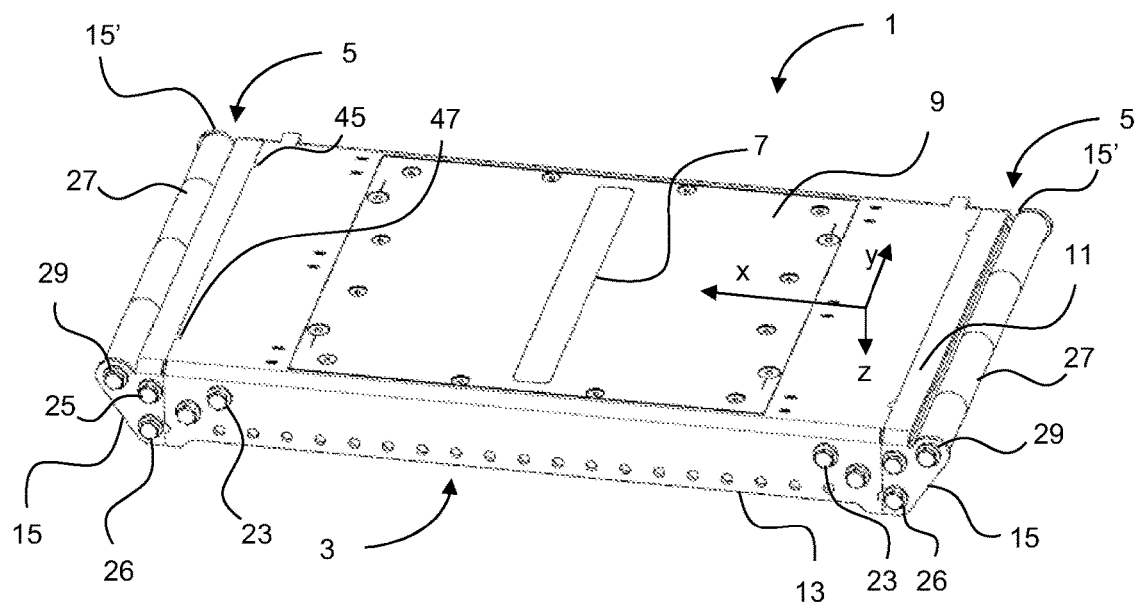
FIG. 1 is a perspective view from above of a belt conveyor according to a first embodiment of the invention with a core element and two roller holder elements.

As can be seen from FIG. 1, a belt conveyor 1 according to an embodiment of the invention has, for example, a core element 3 and two roller holder elements 5 directly adjoining the core element on both sides (left and right) in the conveying direction x. The core element 3 and roller elements 5 each represent a respective support element, with the three support elements arranged in series in the conveying direction.

The core element 3 has a rectangular ground plan with a flat rectangular surface 9 and two side parts 13 (front side part) and 13' (rear side part) adjoining the rectangular ground plan transversely to the conveying direction x, curved vertically downwards and also essentially rectangular.

In the flat surface 9 there is, preferably centrally, a rectangular cut-out 7 extending almost over the entire width (in the y-direction). During operation, radiation, in particular X-rays, can penetrate the surface through this cut-out 7 without further absorption and be detected by a detector, in particular a camera.

Figure 2:
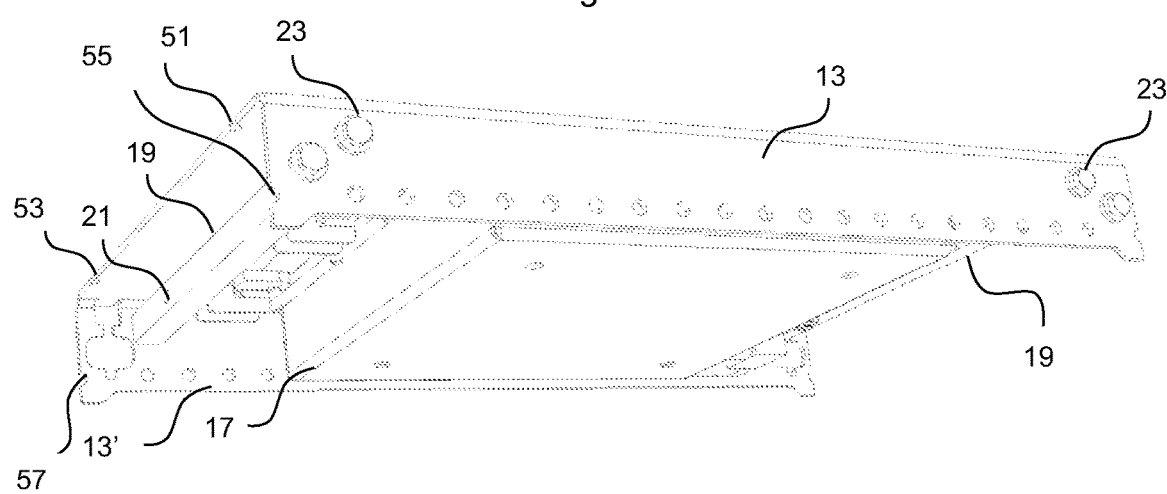
FIG. 2 is a first perspective view from below of a core element as an individual part of a belt conveyor according to FIG. 1.
Figure 3:
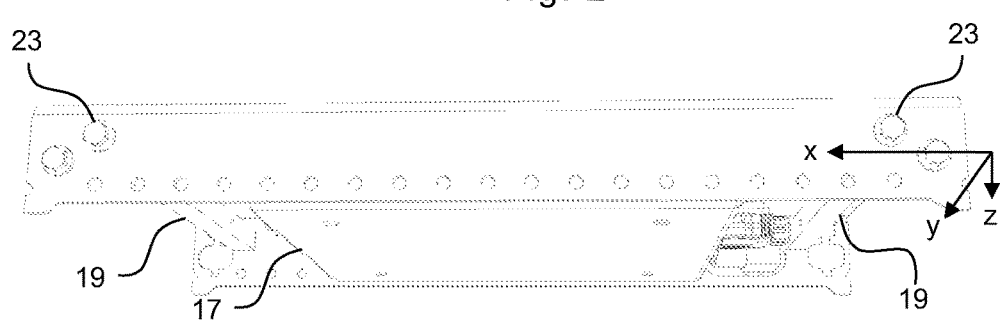
FIG. 3 is a second perspective view from below of the core element shown in FIG. 2.

A corresponding detector can, for example, be housed in a trough 17 (see FIG. 2 and FIG. 3) or camera housing arranged below the surface 9 in the core element 3.

The two roller holder elements 5 shown in FIG. 1 on the left and right sides of core element 3 are symmetrical to each other, so that the following explanations for the left side also apply to the right side. Such a symmetrical roller holder element 5 can be mounted on the left or right side of a core element.

The roller holder element 5 has a flat surface 11, the surfaces 11 and 9 preferably being aligned in the assembled state and serving as a common conveyor plane for supporting a belt 33 not shown in FIG. 1. Roller holder element 5 also includes side parts 15 and 15' at each end in the width direction y shown in FIG. 1.

In order to ensure this predefined, preferably aligned design in three mutually orthogonal spatial directions during assembly in every case, preferably without further adjustment, the roller holder element 5 has a profile in its end-face stop face, which is U-shaped in cross section, which interacts with a complementary profile in the end-face stop surface (which is also U-shaped in cross section) of the core element 3.

In the x-direction, the abutting surfaces of the surfaces 9 and 11 and/or of the side parts 13 and 15, 13' and 15' are limited to each other and are fixed in this position during assembly.

In the y-direction, the first and second protrusions 45 and 47, which are preferably semi-circular on the stop surface or edge of the surface 11, interact with correspondingly formed first and second recesses 51 and 53 in the stop surface or edge of the surface 9, so that the position in the y-direction is also fixed.

In the z-direction shown in FIG. 1, the preferably semi-circular projections 49 and 50 (labelled in FIGS. 5-8) formed on this stop surface or edge of the front and rear side parts 15 and 15' interact with correspondingly formed recesses 55 and 57 (labelled in FIG. 2) in the stop surface or edge of the front and rear side parts 13 and 13', so that the position in the z-direction is also fixed.

For assembly, the core element 3 has cross members 19 (FIG. 2 and FIG. 3) below the surface 9 in the area defined by side parts 13 and 13', which are preferably arranged in the y-direction and parallel to the surface 9 with their ends connected to the side parts 13 and 13', for example by means of screws 23.

Figure 13:
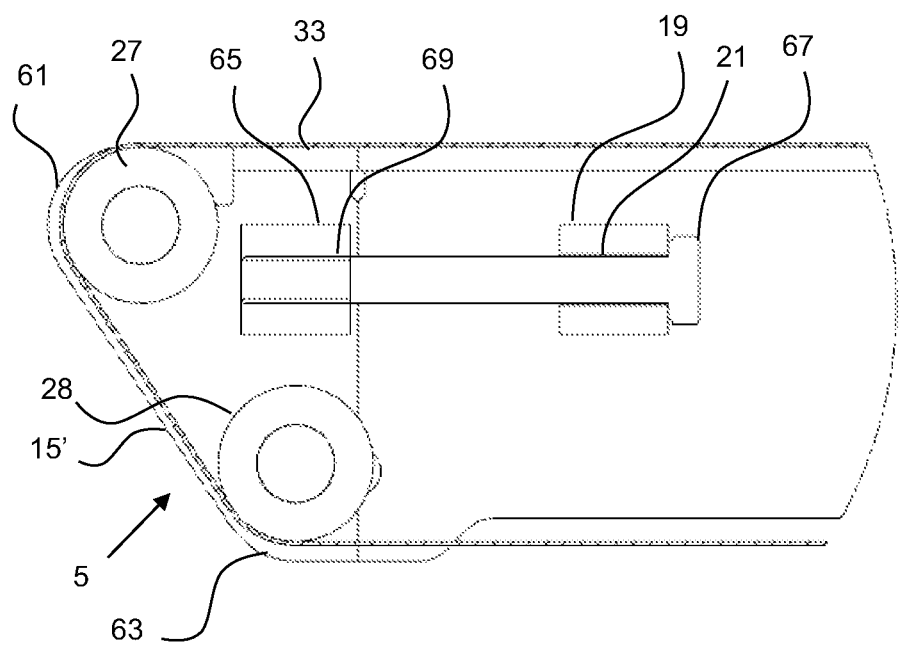
FIG. 13 is a sectional view along the line S-S' in FIG. 11 with belt.

As can be seen from FIG. 13, the roller holder elements 5 also have cross members 65 in an analogous manner, which are arranged on the side parts 15 and 15', for example by means of screws 25 as shown in FIG. 1 for example.

The cross member 19 preferably has two holes 21 (one of which is visible in FIGS. 2 and 13) and the cross member 65 has two threaded holes 69 at the corresponding position, so that by screwing in and tightening screws 67, the roll holders 5 are clearly fixed to the core element 3 by the aforementioned profiles in a predefined position. Cross members 19 and 65 together with the holes 21, threaded holes 69, and screws 67 form a fastening device for fastening the two support elements (roller holder element 5 and core element 3) together. FIG. 13 shows the example fastening device in its connected state. In this example screws 67 may be removed to place the fastening device in a disconnected state so that the two support elements may be separated.

Of course, instead of the fastener explained above, other types such as screw bolts, clamps, etc. may be employed in accordance with the invention. In any case, the predefined position is guaranteed by the profile described above, regardless of any play in the fastener (before final fastening), and incorrect assembly in the wrong position is avoided.

In addition, it is clearly visible in FIG. 13 that the side parts 15 and 15' of the roller holder elements 5 and 5' have projections or overhanging areas 61 and 63 at least in the area of the rollers 27, 28, which project beyond the outer circumference of the rollers 27, 28 (in the drawing plane and transverse to the rollers). These projections ensure the lateral guidance of the belt 33 (transverse to the conveying direction x) so that the belt 33 cannot drift laterally.

Figure 4:
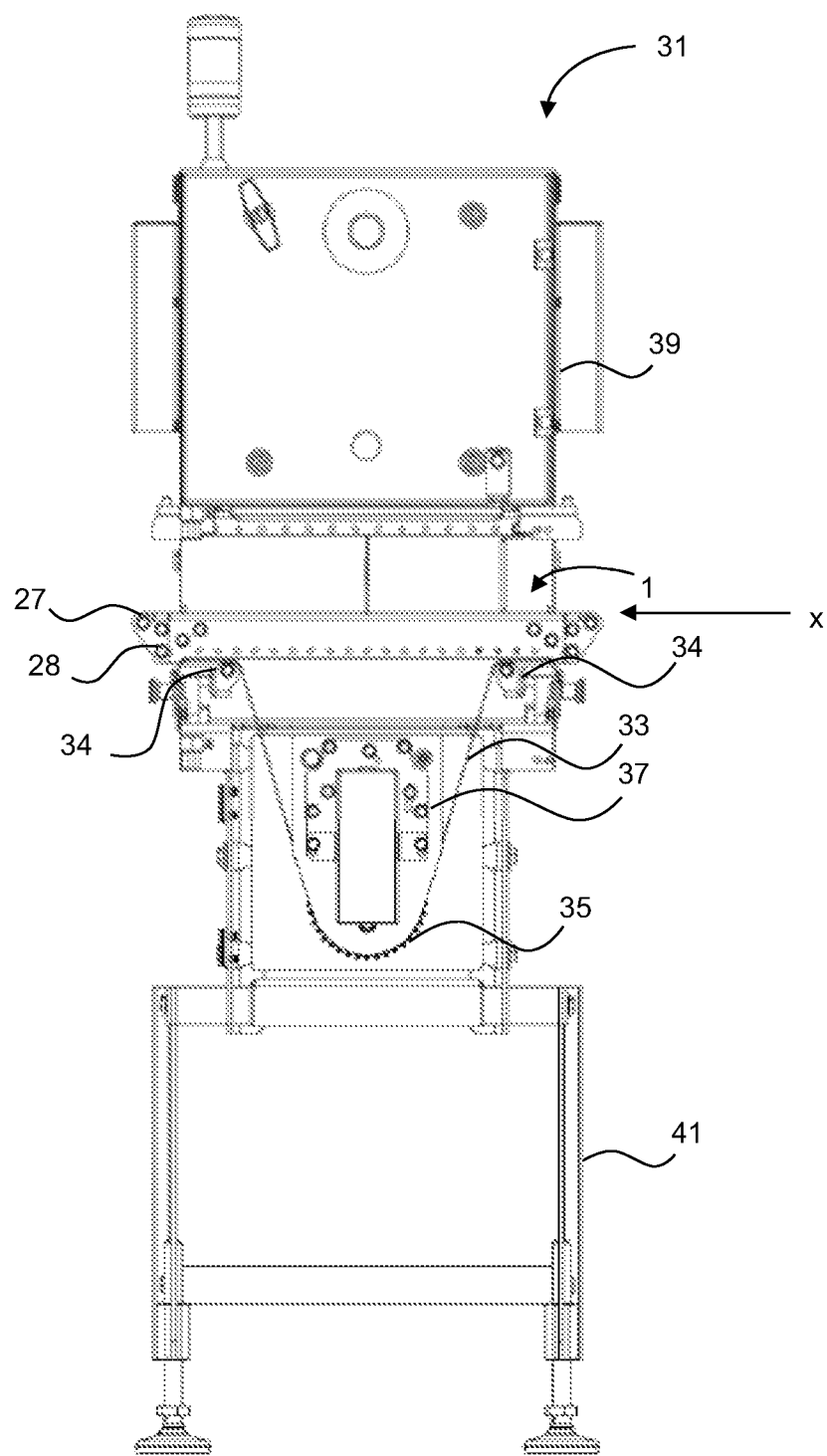
FIG. 4 is an X-ray device with a belt conveyor according to FIG. 1.

As shown in FIG. 4, the belt conveyor 1 can be part of an X-ray scanning device 31. In this case, an attachment 39 with an X-ray source, not shown in the drawing, is arranged above the belt conveyor 1.

Below the belt body 1 there is a base 41 which connects the belt body stationarily to the environment.

In the direction of conveyance x, products are conveyed from the right underneath the attachment 39 and penetrated by the X-ray radiation. The part of the radiation which is not absorbed by the objects and which passes through the cut-out 7 (shown in FIG. 1) is detected by the camera (if necessary via a scintillator).

In the fully assembled state, a belt 33 is driven via rollers 27 and rollers 28 of the belt conveyor 1 and deflection rollers 34 of the X-ray device 31 by a tractor drive arranged below and thus outside the belt conveyor 1. The tractor drive in this example includes a tractor drive roller 35 which is driven by a motor 37 and which engages holes in the belt 33 to drive the belt 33.

Figure 12:
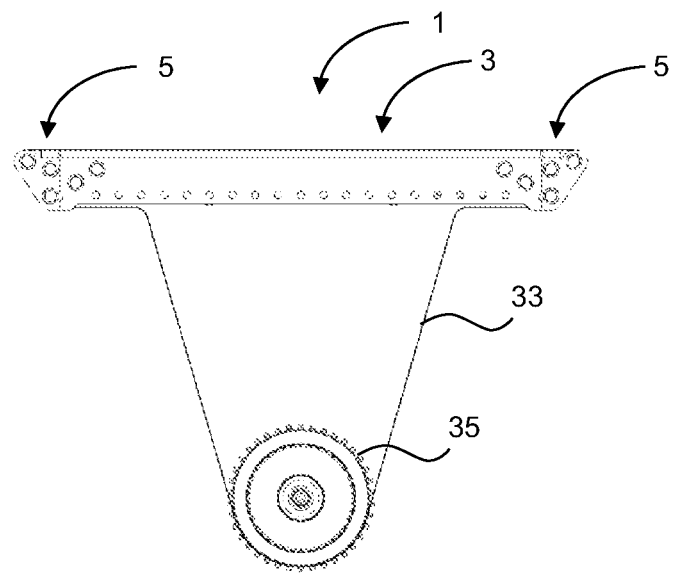
FIG. 12 is a side view of a belt conveyor according to FIG. 1 with a belt and a drive means (tractor drive).

In FIG. 12, the belt conveyor 1 together with belt 33 and tractor drive roller 35 are shown schematically as a single unit to illustrate the belt guidance (but without a graphic representation of the deflection rollers 34).

FIGS. 5 and 6 show the surface 11 and the side parts 15, 15' of a roller holder 5 as a sheet metal bent part 43 in a non-bent state. In this state, in addition to the holes 25' and 29' in the side parts 15, 15' which have not yet been bent at an angle, a hole 28' for fastening the aforementioned roller 28 (shown in FIG. 13) by means of screws 26 (shown in FIG. 1) is also visible.

In the detailed view (FIG. 6) it can be seen that in the area of the bending edge 46 there is a notch or incision 48 extending upwards in the drawing plane. This preferably straight cut (transverse to the x-direction) creates a gap 58 (see FIG. 11) along the stop surface or edge in the assembled state, in which no dirt can collect and which improves the cleaning possibilities of the belt conveyor 1. The width of the gap (in the x-direction) is so small that the products do not sink in during transport.

FIG. 7 and FIG. 8 show another embodiment 43' of the sheet metal part similar to the part 43 shown in FIG. 5 and FIG. 6. In this embodiment 43', the notches 48' each extend close to the projections 45', 47', 49', and 50' (see FIG. 14), so that the projections 45', 47', 49', and 50' have shoulders 44 shown in the detail of FIG. 8.

Figure 14:
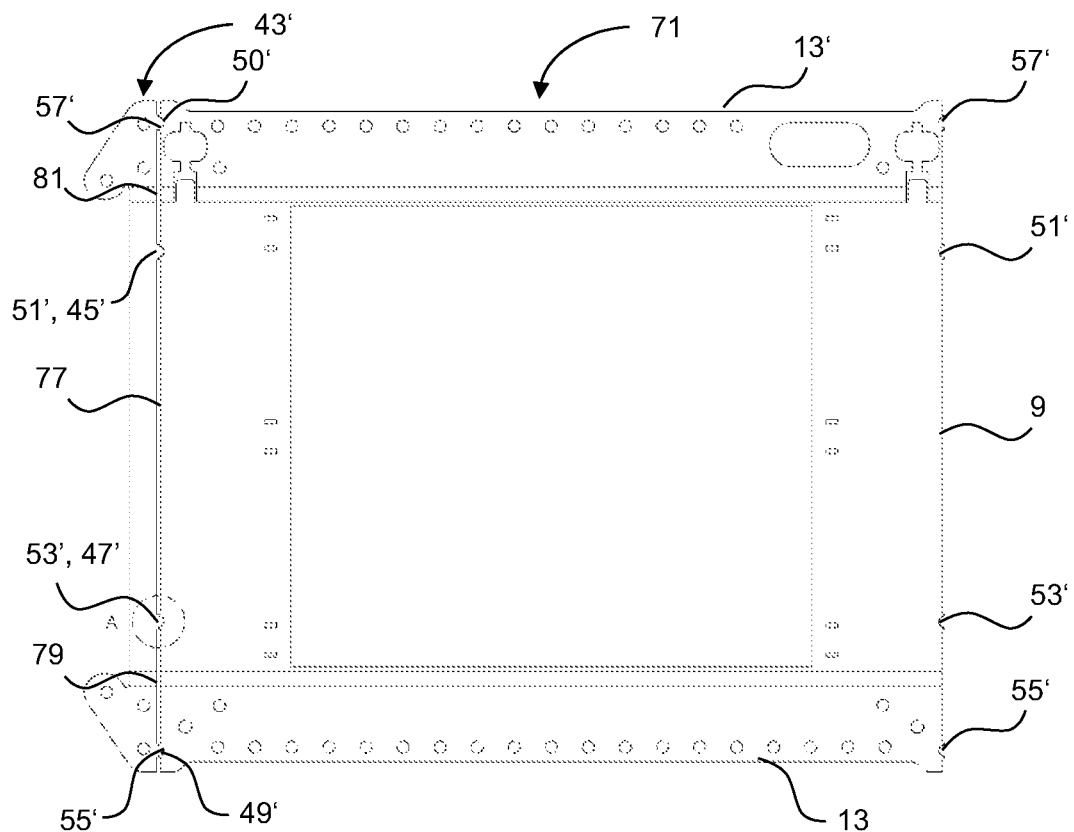
FIG. 14 is a top view of the bent sheet metal parts of a roller holder element and an adjoining core element, both in the not yet bent state.
Figure 15:
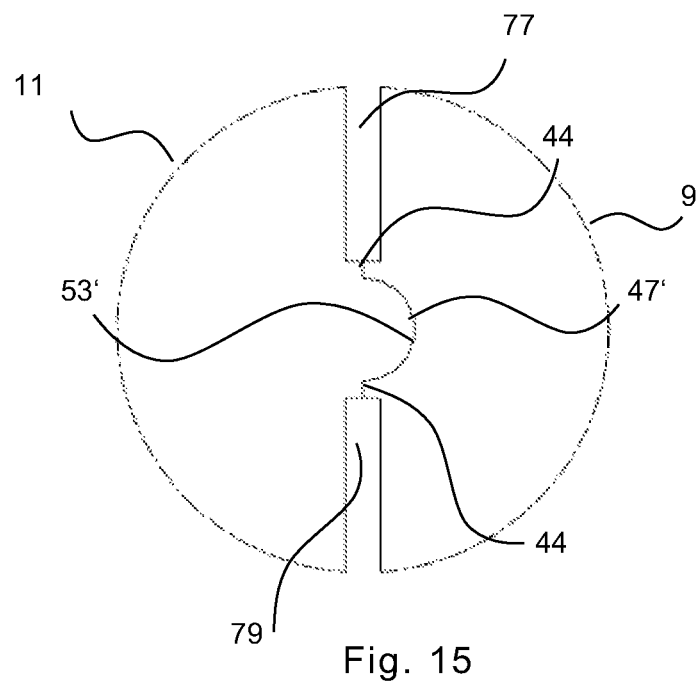
FIG. 15 is an enlarged view of detail A in FIG. 14.

FIG. 14 and FIG. 15 show unbent sheet metal part 71 for forming an alternate core element. In this case (with the exception of the shoulders 44 serving as stop surfaces) gaps are formed in the entire remainder of the opposing end faces of adjoining support elements. In particular, gaps 77, 79, 81 are provided between recesses 51' and 53', 53' and 55' and 51' and 57', respectively. FIG. 14 also shows that a gap is provided between recess 55' and the edge of part 13 and a gap is also provided between recess 57' and the edge of part 13'.

The aforementioned notches can be formed on one side in a stop edge of a support element or, as shown in FIG. 14 and FIG. 15, preferably in both stop edges of adjoining support elements.

Figure 9:
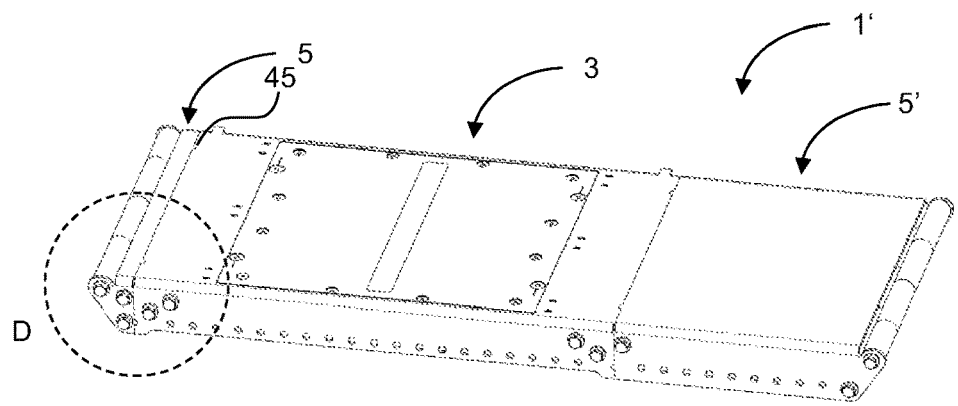
FIG. 9 is a perspective view from above of a second embodiment (medium length) of a belt conveyor according to the invention.
Figure 10:
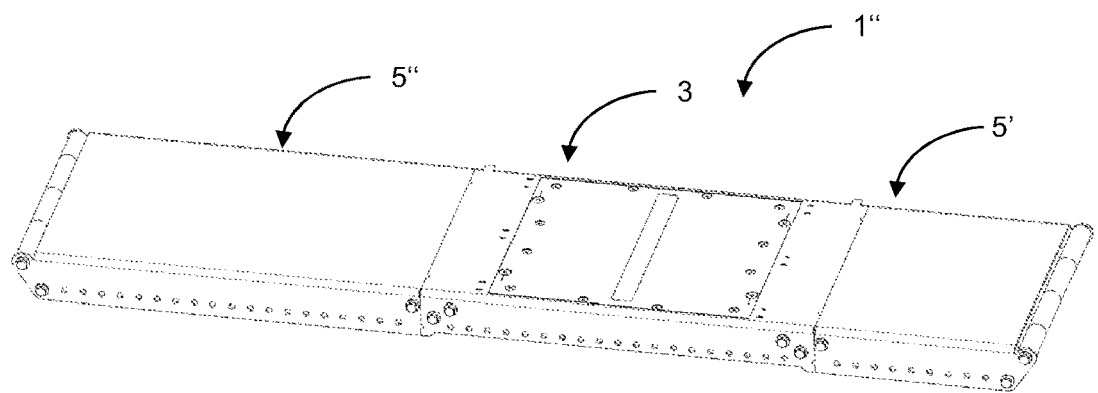
FIG. 10 is a perspective view from above of a third embodiment (long length) of a belt conveyor according to the invention.

To better illustrate the possibilities of the invention, FIG. 9 and FIG. 10 show two further embodiments of a belt conveyor according to the invention.

As can be seen in FIG. 9, compared to the short design of a belt conveyor 1 shown in FIG. 1 and FIG. 4, a belt conveyor 1' with an increased length (viewed in the conveying direction x) is shown. This medium belt or construction size is achieved with a preferably constant core element 3 by mounting a roller holder element 5' with an increased length (in the x-direction or conveying direction) on at least one side.

As can be seen in FIG. 10, a roller holder element 5" (arranged on the left side) with a further increased length can also be arranged on an unchanged core element 3. In principle, the different roller holder elements can be manufactured individually in any shape or length. However, even when producing large quantities, a large variability can be achieved by combining a small number of standard roller holder elements of different lengths, thus saving costs.

Of course, it is also possible to manufacture core elements (such as core element 3) of different lengths, so that this can also be adapted to the most varied requirements. In this case, the length of the roller holder elements can remain constant.

In other embodiments, however, the core element 3 (due to its more complicated structure) is firmly connected during manufacture to a detector, in particular a camera, accommodated therein or arranged thereon, so that no undesirable tolerances can arise in the field during the otherwise necessary assembly. Since the core element remains unchanged, it can be manufactured cost-effectively in large numbers. Similarly, the inspection device can be pre-produced identically as a short basic device (including core element 3 without mounted roller holder elements 5) in large numbers. Appropriate roller holder elements 5 are then selected for the respective application and mounted on the core element 3.

Advantageously, it is even possible to adapt a belt conveyor according to the invention in the field to different product geometries (lengths) and different product distances and gaps in the production operation, which were not yet known when the order was placed and the inspection device was manufactured.

In any case, according to the invention, the aforementioned support elements (different roller holder elements and/or different core elements) can be manufactured separately. During assembly, these support elements align themselves as described above so that they can be quickly assembled in the predefined position without time-consuming adjustment.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE LIST

1 Belt conveyor (short)
1' Belt conveyor (medium)
1" Belt conveyor (long)
3 Core element
5 Roller holder element (short)
5' Roller holder element (medium)
5" Roller holder element (long)
7 Cut-out for X-rays (compartments)
9 Upper surface of the core element 3
11 Upper surface of the roller holder element 5
13 Front side part of the core element
13' Rear side part of the core element
15 Front side part of the roller holder element
15' Rear side part of the roller holder element
17 Trough for holding an X-ray camera
19 Cross member of the core element
21 Holes in the cross member 19 (drill holes)
23 Fastening screws for cross member 19 in core element 3
25 Fastening screws for cross member 65 in roller holder element 5
25' Hole in side panel 15 for fastening screw 25
26 Fastening screw for roller 28
27 Roller
28 Roller
28' Hole in side panel 15 for fastening screw 26
29 Fastening screws for roller 27
29' Hole in side panel 15 for fastening screw 29
31 X-ray scanning device
33 Belt
34 Deflection pulley
35 Tractor drive roller for belt 33
37 Motor
39 Attachment with X-ray source
41 Underframe
43 Sheet metal part (unbent) of the roller holder element 5
43' Sheet metal part (unbent) of the roller holder element 5 with shoulders 44
44 Shoulders
45 First protrusion in the surface of the roller holder element 5
45' First protrusion in the surface of the sheet metal part 43'
46 Bending edge
47 Second protrusion the in surface of roller holder element 5
47' Second protrusion in the surface of sheet metal part 43'
48 Notch
48' Elongated notch
49 Protrusion in front side part of roller holder element 5
49' Protrusion in front side part of sheet metal part 43'
50 Protrusion in rear side part of roller holder element 5

Figure 11:
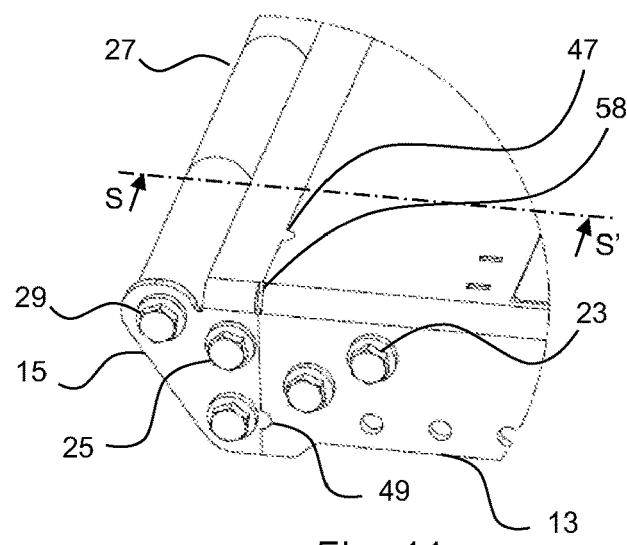
FIG. 11 is an enlarged view of detail D in FIG. 9.

50' Protrusion in rear side part of sheet metal part 43'
51 First recess in surface of core element 3
51' First recess in surface of sheet metal part 71
53 Second recess in surface of core element 3
53' Second recess in surface of sheet metal part 71
55 Recess in front side part 13 of core element 3
55' Recess in front side part of sheet metal part 71
57 Recess in rear side part 13' of core element 3
57' Recess in rear side part of sheet metal part 71
58 Gap
61 Overhang
63 Overhang
65 Cross member of the roller holder element 5
67 Screw
69 Thread in cross member 65
71 Sheet metal part (unbent) of the core element 3
77 Gap between 51' and 53' or 45' and 47'
79 Gap between 53' and 55' and 47' and 49' respectively
81 Gap between 51' and 50'
A Detail in FIG. 13
D Detail in FIG. 8
S-S' Section line in FIG. 11
x Conveying direction first spatial direction
y Second spatial direction in conveyor plane or surface 11 and transverse to X
z Third spatial direction perpendicular to the surface 11

The invention claimed is:

1. A belt conveyor for transporting products in a conveying direction, the belt conveyor including:
   (a) at least two support elements connected together in an assembled state in which the support elements are arranged in series in the conveying direction with each support element being adjacent to at least one other support element in the conveying direction, each support element included in the belt conveyor being separately formed and comprising either a roller holder element or a core element, wherein adjacent support elements in the conveying direction are rigidly connected together by a fastening device so as to form a conveyor plane for supporting a belt for conveying products in the conveying direction;
   (b) wherein each support element has a stop surface that, in the assembled state, abuts a stop surface of an adjacent support element in the belt conveyor in the conveying direction; and
   (c) wherein each stop surface has a profile that is complementary to the profile of the abutting stop surface, the profiles of abutting stop surfaces cooperating to provide a predefined alignment of adjacent support elements in three mutually orthogonal spatial directions comprising the conveying direction in the conveyor plane, a transverse direction in the conveyor plane extending transversely to the conveying direction, and a vertical direction extending perpendicularly to the conveyor plane, wherein at least two of the support elements that lie adjacent to each other in the belt conveyor are constructed as bent sheet metal parts forming an inverted U-shape in a plane extending in the transverse direction perpendicular to the conveyor plane.

2. The belt conveyor of claim 1 wherein in each pair of abutting stop surfaces, one of the pair of abutting stop surfaces includes multiple protrusions and the other one of the pair of abutting stop surfaces includes multiple recesses complementary to the multiple protrusions, each respective protrusion received in a respective one of the recesses.

3. The belt conveyor of claim 1 wherein each pair of abutting stop surfaces are aligned at least in the conveyor plane.

4. The belt conveyor of claim 1 wherein each fastening device is operable to be placed alternatively in a connected state and a disconnected state, each fastening device residing in its respective connected state when the belt conveyor is in the assembled state.

5. The belt conveyor of claim 1 wherein the stop surface of at least one of the support elements in the belt conveyor is interrupted by one or more notches which each form at least a portion of a gap between the at least one support element and an adjacent support element in the belt conveyor.

6. An inspection device including the belt conveyor of claim 1.

7. A method of manufacturing the inspection device of claim 6 characterized in that at least two support elements from a group of roller holder elements and core elements are connected together to form a conveyor plane for supporting a belt for transporting products in a conveying direction (x),
   (a) wherein the at least two support elements are formed separately and wherein directly adjoining support elements are rigidly connected to each other by means of a fastening device,
   (b) wherein, in the assembled state, support elements adjoining one another in the conveying direction have abutting stop surfaces,
   (c) wherein the stop surfaces have complementary profiles, the profiles cooperating in such a way that a predefined alignment of adjoining support elements in three mutually orthogonal spatial directions is ensured,
   (d) wherein the first spatial direction (x-axis) lies in the conveyor plane in the conveying direction, the second spatial direction (y-axis) lies in the conveyor plane transversely to the conveying direction and the third spatial direction (z-axis) lies perpendicular to the conveyor plane, and
   (e) wherein the at least two of the support elements adjoining one another are constructed as bent sheet metal parts forming an inverted U-shape in a plane extending in the transverse direction perpendicular to the conveyor plane.

8. A method for converting the inspection device of claim 6 characterized in that the core element remains unchanged in the inspection device while at least one of the support elements adjacent in the conveying direction is exchanged.

9. A first support element for a belt conveyor, the belt conveyor including the first support element and a second support element adapted to be connected together with the first support element in an assembled state in which the first support element and the second support element are rigidly connected in series in a conveying direction so as to form a portion of a conveyor plane for supporting a belt for conveying products in the conveying direction, the first support element including:
   (a) a first fastening part adapted to be connected to a fastening part of the second support element in the conveying direction to provide the rigid connection between the first support element and the second support element;
   (b) a first upper surface adapted to form part of the conveyor plane when the first support element is connected in the assembled state with the second support element;

(c) a first stop surface adapted to abut a stop surface of the second support element when the first support element is connected in the assembled state with the second support element; and (d) wherein the first stop surface has a profile that is complementary to the profile of the stop surface of the second support element so that when the first support element is connected in the assembled state with the second support element, the profile of the first stop surface cooperates with the profile of the stop surface of the second support element to provide a predefined alignment of the first support element and the second support element in three mutually orthogonal spatial directions comprising the conveying direction in the conveyor plane, a transverse direction in the conveyor plane extending transversely to the conveying direction, and a vertical direction extending perpendicularly to the conveyor plane, wherein the first support element and the second support elements rigidly connected in series are constructed as bent sheet metal parts forming an inverted U-shape in a plane extending in the transverse direction perpendicular to the conveyor plane.

10. The first support element of claim 9 further including at least one roller adapted to receive a belt of the belt conveyor so that the first support element.

11. The first support element of claim 9 wherein the first stop surface is adapted to align with the stop surface of the second support element at least in the conveyor plane when the first support element is connected in the assembled state with the second support element.

12. The first support element of claim 9 wherein the profile of the first stop surface includes multiple protrusions, each protrusion being adapted to be received in a respective recess in the stop surface of the second support element.

13. The first support element of claim 9 wherein the profile of the first stop surface includes multiple recesses, each recess being adapted to receive a respective protrusion in the stop surface of the second support element.

* * * * *